J. A. MURRAY & C. N. WILT.

NON-SKID DEVICE.

APPLICATION FILED NOV. 27, 1917.

Reissued Mar. 26, 1918. 14,450.

Inventors

J. A. Murray,

C. N. Wilt,

By Mr. H. Babcock & Son

Attorneys

UNITED STATES PATENT OFFICE.

JOHN A. MURRAY AND CHARLES N. WILT, OF PONTIAC, MICHIGAN, ASSIGNORS, BY MESNE ASSIGNMENTS, TO THE ROWE CALK COMPANY, OF HARTFORD, CONNECTICUT, A CORPORATION OF CONNECTICUT.

NON-SKID DEVICE.

14,450. Specification of Reissued Letters Patent. Reissued Mar. 26, 1918.

Original No. 1,215,202, dated February 6, 1917, Serial No. 110,592, filed July 21, 1916. Application for reissue filed November 27, 1917. Serial No. 204,206.

*To all whom it may concern:*

Be it known that we, JOHN A. MURRAY and CHARLES N. WILT, citizens of the United States, residing at Pontiac, in the county of Oakland and State of Michigan, have invented new and useful Improvements in Non-Skid Devices, of which the following is a specification.

This invention has for its object to provide a simple and inexpensive non-skidding device primarily adapted for use on motor trucks and exempting the tire from any appreciable wear.

A further object of the invention is the provision of a device of the above stated character, wherein each of the sections of the saddle is provided with means preferably adapted to engage in openings in the felly, for positively preventing the saddle from accidental movement or working circumferentially of the felly or spokes of the wheel.

A still further object of the invention is the provision of hooks formed on the free ends of the saddle sections in order that the chains may be readily connected to the tire either at right angles or diagonally thereof.

With the above and other objects in view, the invention consists in the novel features, details of construction and combination of parts which will hereinafter be more fully set forth, illustrated in the accompanying drawing and pointed out in the appended claims.

Figure 1:
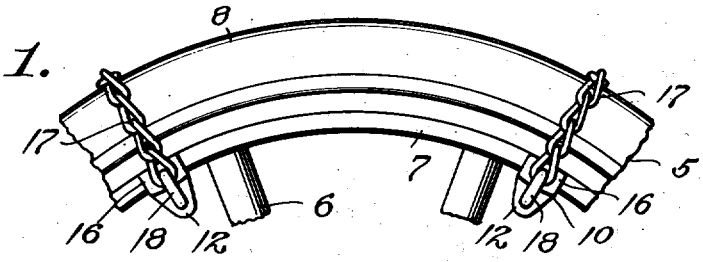
Figure 1 is a side elevation of a portion of the wheel showing the device applied thereto.

Referring more particularly to the drawings, the numeral 5 denotes a wheel having spokes 6 to which is connected the felly 7. Secured upon the felly is a solid tire 8 adapting the wheel for use upon motor trucks.

Our improved anti-skidding device is designated generally by the character 9 and comprises a saddle 10 embodying a pair of sections 11 formed on their confronting ends with depending apertured ears 12 for receiving an adjusting bolt 13. This saddle when in applied position is adapted to be clamped upon the felly with the adjusting bolt 13 interposed between the spokes 6 of the wheel. The outer side faces of the felly 7 of the wheel are formed with a series of concentrically arranged spaced sockets 14 adapted to receive the pairs of inwardly directed spurs 15 formed on the outer end lips 16 of each of the saddle sections 11, thereby positively retaining the saddle from moving or working circumferentially on the felly of the wheel. By this arrangement the saddle will not cause any cutting action of the felly or spokes of the wheel. A further advantage in having the prongs or bosses 15 engaging or seated within the sockets 14 of the felly, is to permit the skid chains 17 to be so connected with the saddle sections as to arrange the same diagonally across the solid tire of the wheel, if so desired.

Figure 2:
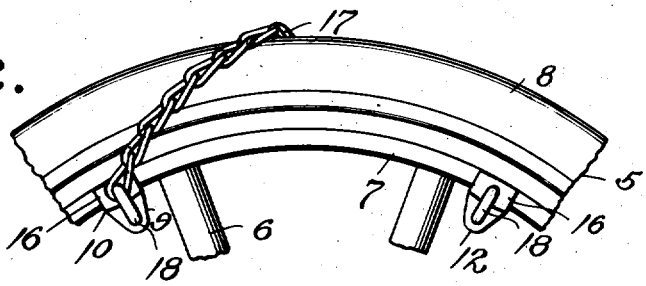
Fig. 2 is a similar view showing the manner of connecting the chains to the saddle sections for arranging the chains diagonally upon the tire.
Figure 3:
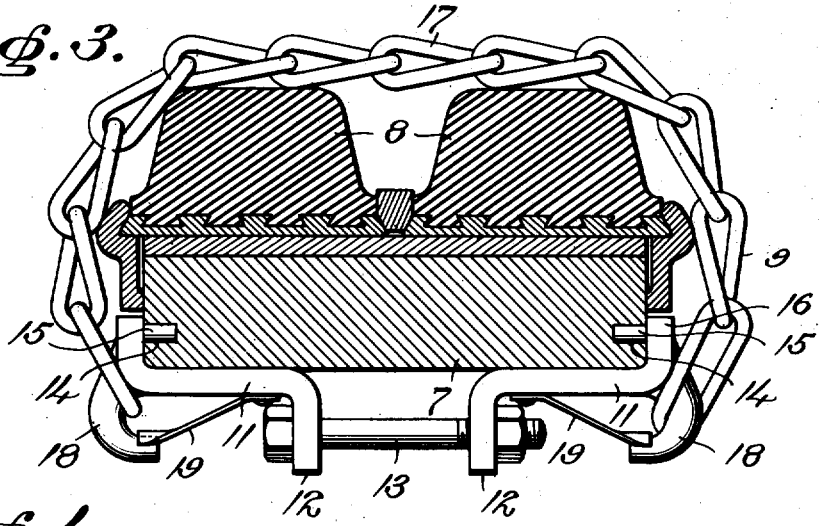
Fig. 3 is a transverse sectional view.
Figure 4:
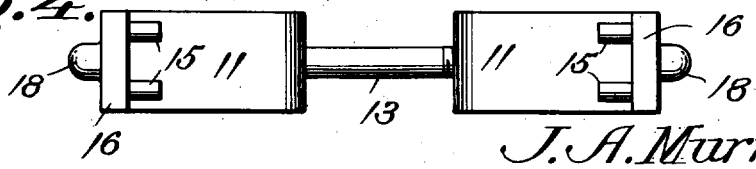
Fig. 4 is a top plan view of the saddle removed from the felly.

The free ends of the sections 11 of the saddle are formed with hooks 18 bent in a direction opposite to the direction of the lips 16, for permitting a quick attachment or detachment of the chains 17 to, or from the saddle. The chains are retained on the hooks 18 through the medium of a flat retaining spring 19. As illustrated in Fig. 1 of the drawing, when the chains are connected to the tire at right angles thereto, the opposite terminals of the anti-skid chains 17 engage with the horizontally alined hooks of each section of the saddle, whereas, when said chains are arranged diagonally of the tire the terminal of one chain is connected to one saddle while the terminal of the opposite chain is connected to one of the hooks of another saddle, as clearly shown in Fig. 2 of the drawing. It is to be further understood that the adjusting bolt 13, aside from holding the saddle upon the felly, further retains the prongs or bosses 15 firmly within the sockets 14. Another feature of the bolt 13 is to allow of the saddle being at all times retained on the felly of the wheel, in order that a quick attachment of the chains to the wheel can be had, for instance, when it is desired to lift or raise the wheel of the vehicle out of sand, mud holes, ruts or the like.

The chains are preferably arranged loosely upon the tread of the tire, in order that the same may be readily removed without disturbing the adjustment of the clamps.

From the foregoing description, taken in connection with the drawing, the advantages of construction and of the method of operation will be readily apparent to those skilled in the art to which the invention relates, and while we have described the principles of operation of the invention, together with the device which we now consider to be an embodiment thereof, we desire to have it understood that the device shown is merely illustrative, and that such changes may be made when desired as are within the scope of the claims appended hereto.

Having thus described our invention, what we claim as new and desire to secure by Letters Patent is:

1. The combination with a vehicle wheel having a felly formed with sockets, and a tire on said felly, a saddle detachably connected to the felly and terminally provided with angularly bent lips, means formed on the lips adapted to engage in the sockets of the felly for preventing any circumferential movement of the saddle, hooks formed on the terminals of the saddle and extending in opposite directions to the lips, and cross chains detachably connected with the hooks of the saddle and held thereby transversely of the tire.

2. A non-skidding device including a saddle comprising a pair of adjustably connected sections, each of said sections having an up-bent lip on the outer terminal thereof, inwardly extending prongs formed on the said lips, hooks formed on the outer terminals of each of said sections and depending therefrom, and cross-chains detachably connected with said hooks.

3. In combination with a vehicle wheel having its felly formed with a series of sockets, a tire on said felly, and a saddle detachably connected under the felly, said saddle comprising a pair of sections each provided on their confronting ends with depending apertured ears, a bolt extending through the apertures of the ears for adjustably connecting the saddle to said felly, the free end of each section of the saddle being bent to provide an upstanding lip, means formed integral with the lips for engagement in the sockets of the felly preventing any circumferential creeping movement of the saddle with respect to said felly, hooks formed on the outer faces of said lips and extending in an opposite direction to the lips, and cross chains detachably connected with the hooks of the saddle for holding the chains across the tire.

4. In combination, a felly, a saddle comprising a pair of relatively adjustable sections, means for adjusting said sections and for holding them in adjusted position on the felly, and cross-chains detachably connected to said saddle sections, said saddle sections and felly being formed to positively and detachably engage with each other on opposite sides of the felly to prevent circumferential movement of the said sections on the felly, said sections and their adjusting means being attachable and detachable as a unit and said felly being at all times in condition to receive said sections.

5. In combination, a felly, a pair of relatively adjustable saddle sections and means for adjusting said sections to clamp the felly between them and for holding said sections in adjusted position on said felly, said felly and sections being formed for positive, detachable engagement with each other on opposite sides of the felly to prevent circumferential movement of the said sections on the felly, said sections and their adjusting means being attachable and detachable as a unit and said felly being at all times in condition to receive said sections.

6. A non-skidding device including a saddle comprising a pair of adjustable sections and means for adjusting said sections and holding them firmly against the felly in adjusted position, each of said sections being formed to have positive, detachable engagement with a wheel felly on opposite sides thereof, to prevent movement circumferentially thereof, and adapted to receive and hold a part of an anti-skidding chain, said sections and their adjusting means being attachable and detachable as a unit.

J. A. MURRAY.
CHARLES N. WILT.